(12) United States Patent
Piscopo

(10) Patent No.: US 12,355,829 B1
(45) Date of Patent: *Jul. 8, 2025

(54) EFFICIENT SIP MESSAGE MODIFICATION

(71) Applicant: FIRST ORION CORP., North Little Rock, AR (US)

(72) Inventor: Robert Francis Piscopo, Saint Petersburg, FL (US)

(73) Assignee: FIRST ORION CORP., North Little Rock, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,501

(22) Filed: Aug. 27, 2023

Related U.S. Application Data

(63) Continuation of application No. 17/348,723, filed on Jun. 15, 2021, now Pat. No. 11,811,835, which is a continuation of application No. 15/984,032, filed on May 18, 2018, now Pat. No. 11,038,929.

(60) Provisional application No. 62/510,721, filed on May 24, 2017.

(51) Int. Cl.
*H04L 65/1104* (2022.01)
*H04L 65/1096* (2022.01)

(52) U.S. Cl.
CPC ...... *H04L 65/1104* (2022.05); *H04L 65/1096* (2013.01)

(58) Field of Classification Search
CPC .............. H04L 65/1006; H04L 65/1096
See application file for complete search history.

(56) References Cited

U.S. PATENT DOCUMENTS

| 7,471,783 | B1 | 12/2008 | Shen et al. | |
| 7,610,384 | B1* | 10/2009 | Schulzrinne | H04L 69/16 |
| | | | | 709/227 |
| 8,423,658 | B2* | 4/2013 | Shatsky | H04L 65/612 |
| | | | | 709/227 |
| 8,527,656 | B2 | 9/2013 | Baker et al. | |
| 8,737,385 | B2* | 5/2014 | Olshansky | H04Q 3/62 |
| | | | | 370/352 |
| 9,054,909 | B2 | 6/2015 | Shtiegman et al. | |
| 9,372,963 | B2* | 6/2016 | Lau | H04L 65/1104 |
| 2007/0008955 | A1* | 1/2007 | Delaney | H04L 65/104 |
| | | | | 370/352 |
| 2007/0019633 | A1* | 1/2007 | Tomar | H04L 65/1101 |
| | | | | 370/352 |
| 2008/0118040 | A1 | 5/2008 | Shi | |
| 2008/0170563 | A1* | 7/2008 | Zhu | H04L 65/1069 |
| | | | | 370/352 |
| 2008/0232392 | A1* | 9/2008 | Liang | H04L 65/80 |
| | | | | 370/450 |
| 2008/0299980 | A1 | 12/2008 | Buckley et al. | |
| 2008/0317233 | A1 | 12/2008 | Rey et al. | |
| 2009/0215438 | A1 | 8/2009 | Mittal et al. | |

(Continued)

*Primary Examiner* — Redentor Pasia

(57) ABSTRACT

The instant application provides a method providing one or more of: receiving, by a control node coupled to a SIP node, a SIP message from the SIP node, parsing the SIP message to determine a message type and content, modifying the SIP message content to create a modified SIP message, transmitting the modified SIP message to the SIP node, receiving, by the SIP node, the modified SIP message within a predetermined time period, and forwarding, by the SIP node, the modified SIP message to a destination SIP node in the SIP call path. The control node is not in a SIP call path.

20 Claims, 5 Drawing Sheets

(56) References Cited

U.S. PATENT DOCUMENTS

| | | | |
|---|---|---|---|
| 2010/0048176 A1* | 2/2010 | Osborn | H04W 12/06 455/411 |
| 2011/0007735 A1* | 1/2011 | Kruithof | H04L 61/4557 370/352 |
| 2012/0270554 A1 | 10/2012 | Hellwig et al. | |
| 2012/0275457 A1 | 11/2012 | Bijwaard et al. | |
| 2014/0010118 A1 | 1/2014 | Bakker | |
| 2015/0003342 A1* | 1/2015 | Swaminathan | H04W 76/18 370/329 |
| 2015/0264182 A1 | 9/2015 | Mahajan et al. | |
| 2016/0308915 A1 | 10/2016 | Balasaygun et al. | |
| 2016/0352903 A1 | 12/2016 | Hp et al. | |
| 2017/0308932 A1 | 10/2017 | Qiu et al. | |
| 2018/0103150 A1 | 4/2018 | Chavez et al. | |
| 2019/0014045 A1* | 1/2019 | Zwaal | H04L 45/74 |
| 2022/0256039 A1 | 8/2022 | Kahn | |

* cited by examiner

Fig. 1 System Diagram – Add Calling Name Information
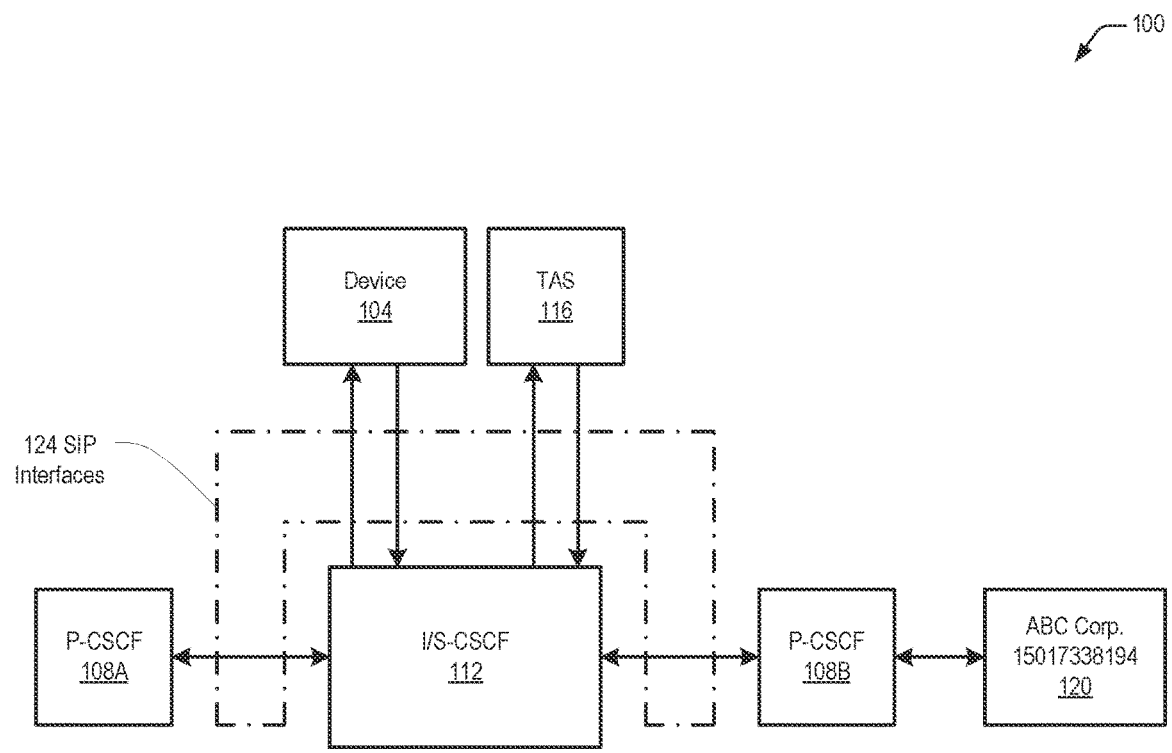

Fig. 2 System Diagram – Call Blocking
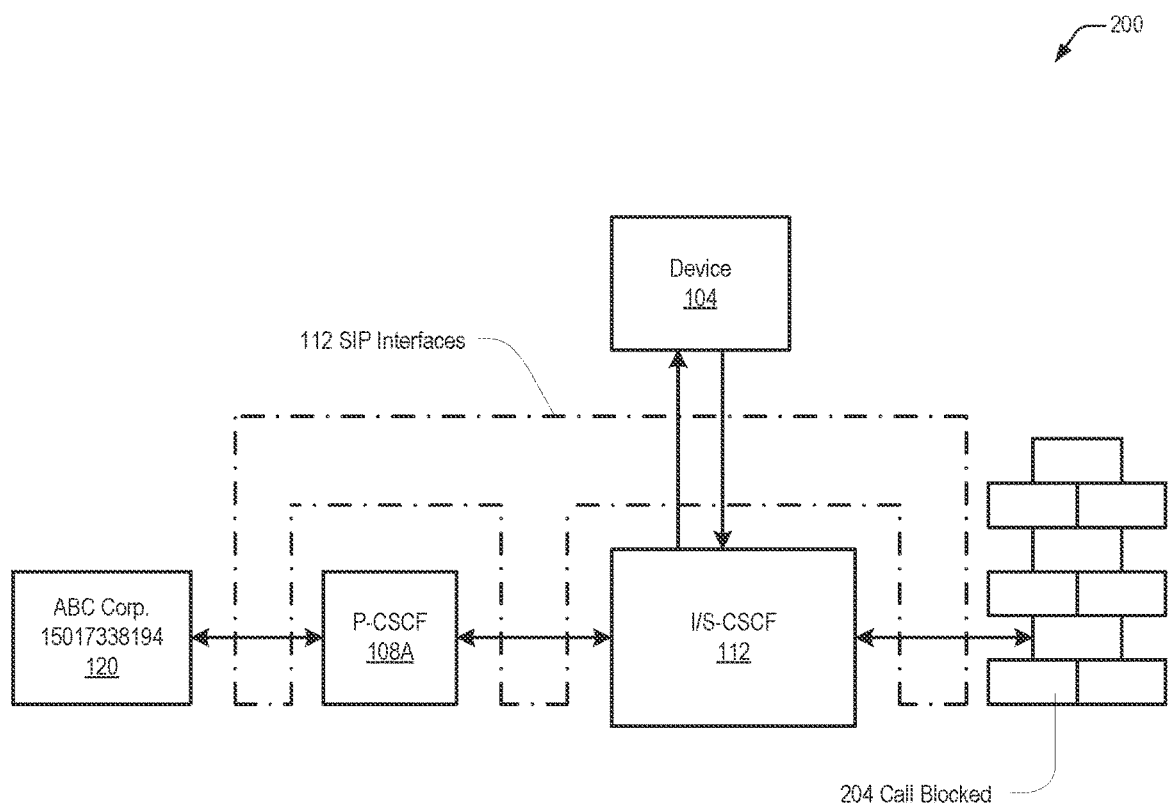

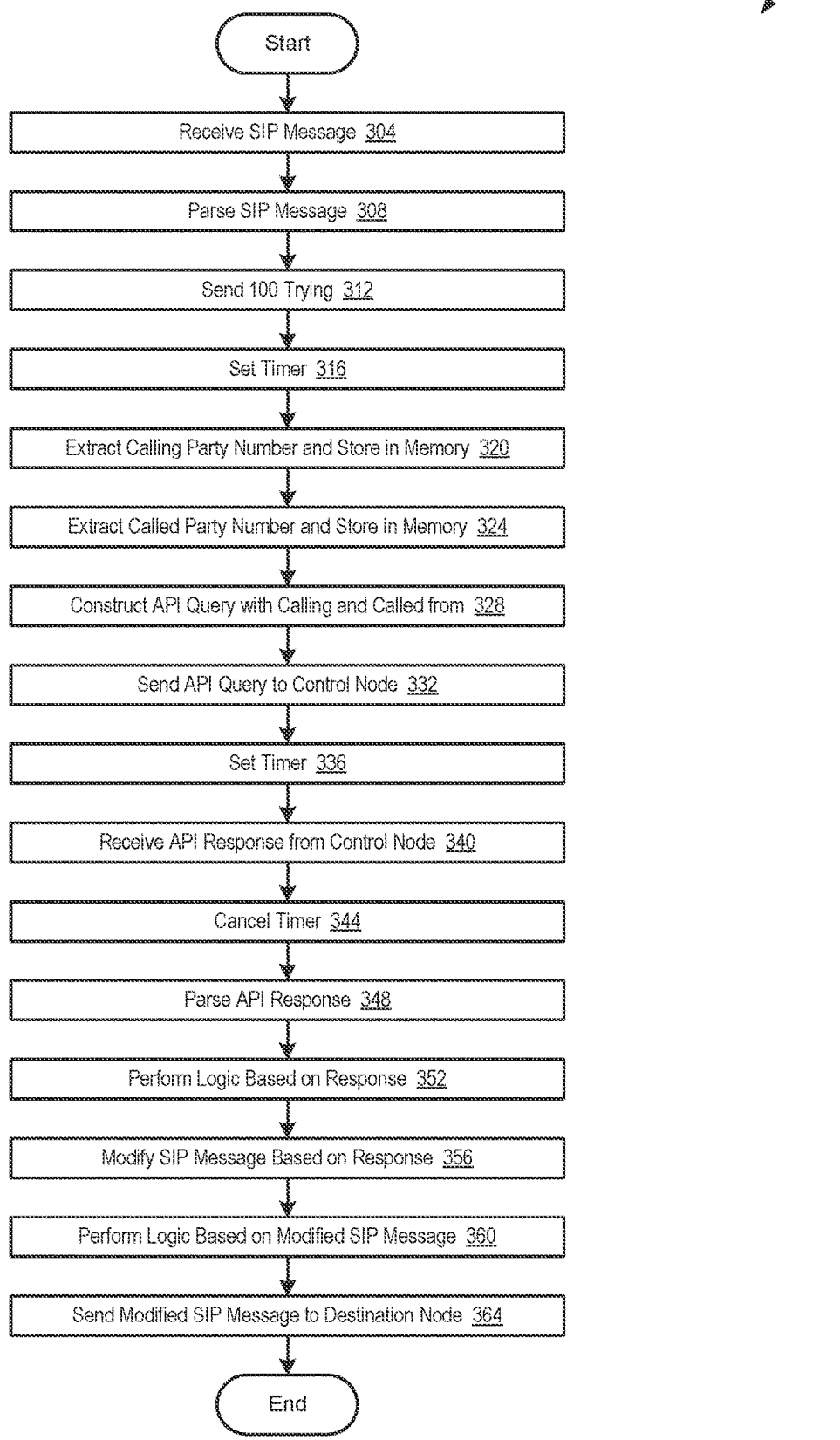

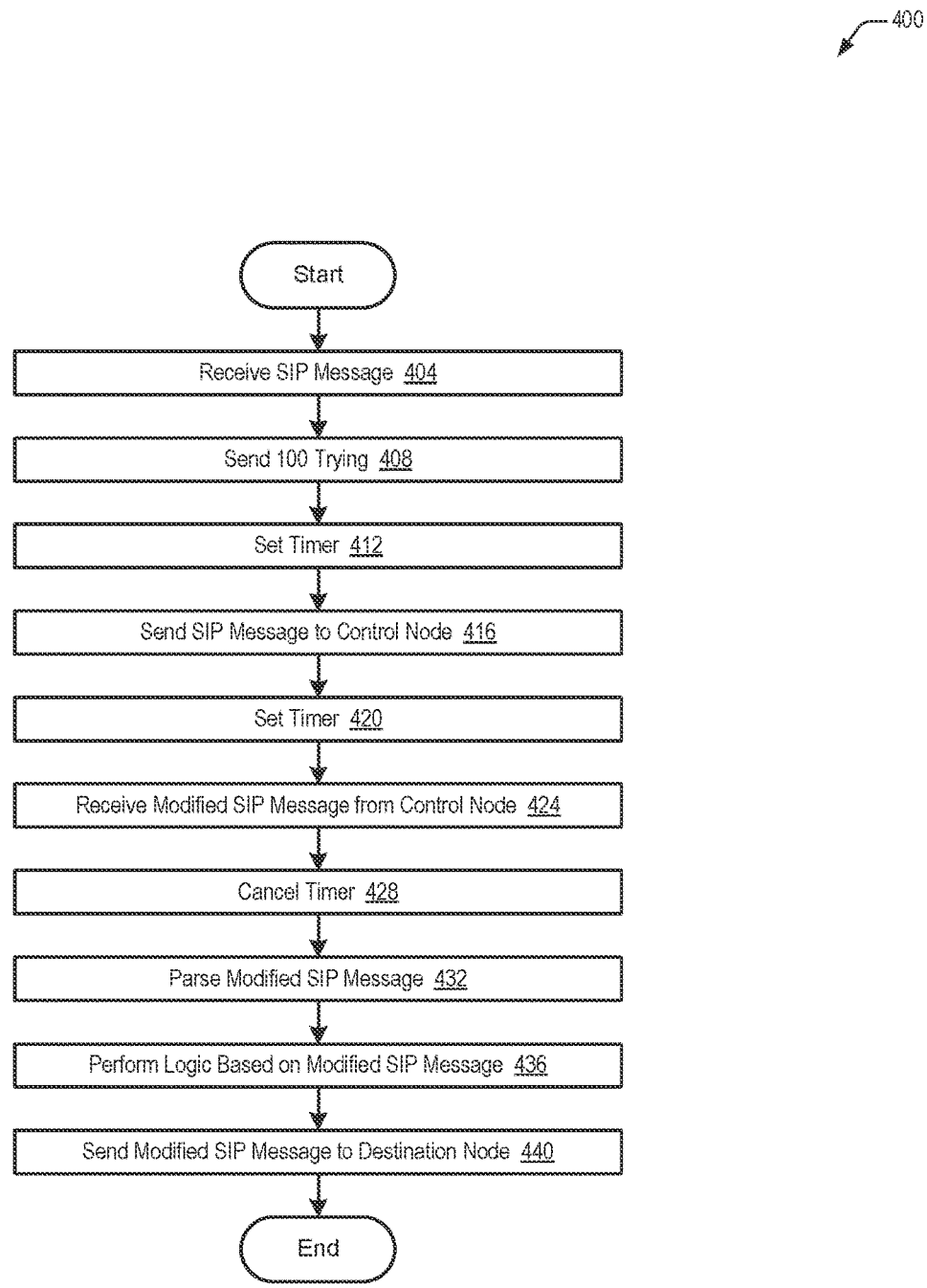
Fig. 4 External Call Control Using SIP-Based Control Process

Fig. 5 Device Block Diagram
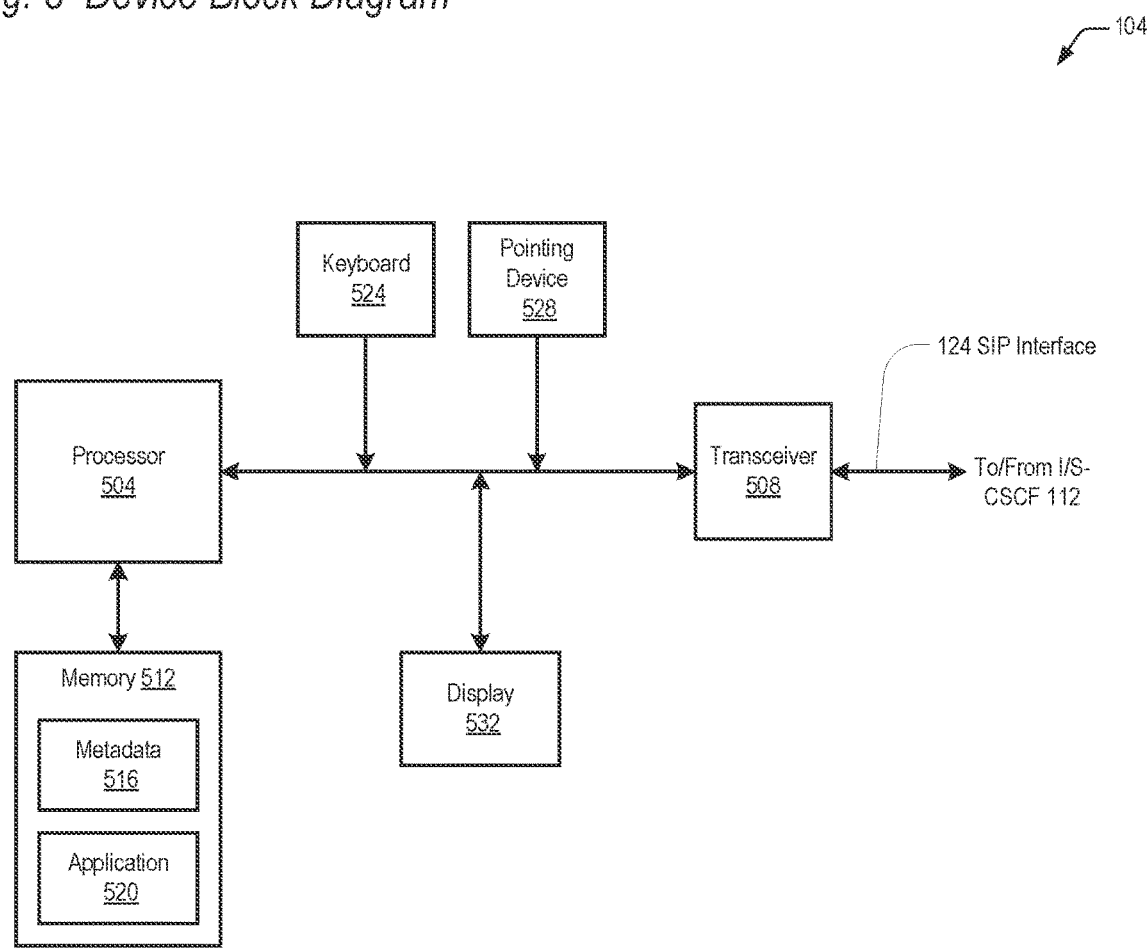

__EFFICIENT SIP MESSAGE MODIFICATION__

CROSS-REFERENCE TO RELATED APPLICATION

This application is a continuation of U.S. patent application Ser. No. 17/348,723, filed on Jun. 15, 2021, which is a continuation of U.S. patent application Ser. No. 15/984,032, filed on May 18, 2018, now U.S. Pat. No. 11,038,929, issued on Jun. 15, 2021, which claims priority to earlier filed provisional application No. 62/510,721 filed May 24, 2017 and entitled "EFFICIENT SIP MESSAGE MODIFICATION", the entire contents of which are hereby incorporated by reference.

TECHNICAL FIELD OF THE APPLICATION

This application relates to improved methods, devices, and computer programs for efficient processing of SIP Messages by an out-of-call-path node.

BACKGROUND OF THE APPLICATION

SIP nodes may be SIP Clients (UAC), SIP Servers (UAS), SIP Proxies (both UAC/UAS), or a Redirect Server. SIP protocol messages may be conventionally modified using a node in the call path. The SIP node in the call path may query another node to obtain routing information or other information required to enhance an INVITE message. For example the SIP node could use a CAMEL query or a REST query to obtain this information. In this example the node parses a SIP INVITE received from an initiating endpoint, extracts called/calling party information out of the INVITE, and places the elements into another protocol message. The other protocol message is transferred to another node, which parses the protocol and sends back a response. The first node then parses the response, processes the result, and creates a new INVITE based on the response. Call processing then continues using the new INVITE. What is needed is a more efficient way of processing SIP protocol messages, without requiring an in-path node to repackage parts of the messages in another protocol and then repackage the response into the original SIP message.

SUMMARY OF THE APPLICATION

One example embodiment may provide a method. The method includes one or more of: receiving, by a control node coupled to a SIP node, a SIP message from the SIP node, parsing the SIP message to determine a message type and content, modifying the SIP message content to create a modified SIP message, transmitting the modified SIP message to the SIP node, receiving, by the SIP node, the modified SIP message within a predetermined time period, and forwarding, by the SIP node, the modified SIP message to a destination SIP node in the SIP call path. The control node is not in a SIP call path.

Another example embodiment may include a device. The device includes a processor and a memory, coupled to the processor, and storing logic that when executed causes the device, coupled to a SIP protocol network, to perform one or more of: receive, by the device, a SIP message from a SIP node, parse the SIP message to determine a message type and content, modify the SIP message content to create a modified SIP message, transmit the modified SIP message to the SIP node, receive, by the SIP node, the modified SIP message within a predetermined time period, and forward, by the SIP node, the modified SIP message to a destination SIP node in the SIP call path. The device is coupled to the SIP node and is not in a SIP call path.

Yet another example embodiment may include a non-transitory computer readable storage medium configured to store computer instructions that when executed cause a processor to perform one or more of: receiving, by a control node not in a SIP call path and comprising the processor, a SIP message from a SIP node, parsing the SIP message to determine a message type and content, modifying the SIP message content to create a modified SIP message, transmitting the modified SIP message to the SIP node, receiving, by the SIP node, the modified SIP message within a predetermined time period, and forwarding, by the SIP node, the modified SIP message to a destination SIP node in the SIP call path. The control node is coupled to the SIP node.

An advantage of the present application is it provides a more efficient way to modify SIP protocol messages by eliminating many unnecessary steps for a node within the call path. Because of the real time nature of SIP based Voice Call setup, any efficiency improvement can potentially result in a large overall gain.

Another advantage of the present application is it provides an SIP network system that does not require API-based protocol conversion in order to modify SIP messages.

BRIEF DESCRIPTION OF THE DRAWINGS

FIG. 1 illustrates a system diagram including add calling name information according to embodiments of the present application.

FIG. 2 illustrates a system diagram including call blocking in accordance with embodiments of the present application.

FIG. 3 illustrates a flowchart of an external call control using an API-based control process in accordance with embodiments of the present application.

FIG. 4 illustrates a flowchart of external call control using a SIP-based control process in accordance with embodiments of the present application.

FIG. 5 illustrates a block diagram of a control node or device 104 in accordance with embodiments of the present application.

DETAILED DESCRIPTION OF THE APPLICATION

The present application generally relates to improved methods and devices for transferring SIP protocol messages over a SIP network. The present application does not require protocol conversion between SIP and another protocol. For example, a first node sends a second node a copy of a SIP INVITE message, and sets a timer. The second node performs processing based on the SIP INVITE, alters headers within the SIP INVITE, and sends the modified SIP INVITE back to the first node. The first node replaces the original SIP INVITE with the modified SIP INVITE, and continues processing the call. If the timer expires before receiving the modified SIP INVITE, the first node continues call processing using the original SIP INVITE. The second node (control node or device 104), which performs the SIP INVITE modification, is neither a SIP Client, a SIP Server, a SIP Proxy, nor a Redirect Server.

Many SIP nodes change the contents of SIP messages for various reasons. Typically, the changes are done to ensure the downstream nodes know how to process/route the message. Many SIP nodes have header manipulation rule (HMR) functionality. Most notably, I-SBCs use HMR's to ensure SIP messages are formatted in a way that a downstream SIP peering network can understand and accept.

SIP nodes may be SIP Clients (UAC), SIP Servers (UAS), SIP Proxies (both UAC/UAS), or a Redirect Server. SIP protocol messages may be conventionally modified using a node in the call path. The call path includes at least an initiating SIP node, a destination SIP node, and another SIP node. The SIP node in the call path may query the other node to obtain routing information or other information required to enhance an INVITE message. For example the SIP node could use a CAMEL query or a REST query to obtain this information. In this example the node parses a SIP INVITE received from an initiating endpoint, extracts called/calling party information out of the INVITE, and places the elements into another protocol message. The other protocol message is transferred to another node, which parses the protocol and sends back a response. The first node then parses the response, processes the result, and creates a new INVITE based on the response. Call processing then continues using the new INVITE. What is needed is a more efficient way of processing SIP protocol messages, without requiring an in-path node to repackage parts of the messages in another protocol and then repackage the response into the original SIP message.

Referring now to FIG. 1, a system diagram 100 for a system to add calling name information in accordance with embodiments of the present application is shown. User Equipment (UEs) interface with a SIP protocol network through proxy call session control functions (P-CSCF 108), which act as entry points into the core network. The P-CSCF 108 is responsible for routing incoming SIP messages to a registrar server and facilitating policy control for secure access to the SIP network core components. P-CSCF 108A interfaces with interrogating and serving call session control functions (I/S-CSCF 112), which acts as an inbound SIP proxy server for a SIP INVITE or other SIP protocol message from P-CSCF 108A to P-CSCF 108B acting as a proxy for an ABC Corporation UE 120 with an example called number of "1-501-733-8194". The system 100 may also include a telephony application server (TAS) 116. The TAS 116 is an IMS application server that handles voice calls. Each of the nodes within SIP network 100 communicates through SIP interfaces 124.

Central to the present application is SIP device 104, which receives messages from I/S-CSCF 112, modifies the messages, and sends the modified messages back to I/S-CSCF 112. SIP device 104 acts as a new control platform for performing one or more value-added services, including but not limited to call routing, header manipulation, interworking functions, CNAM resolution, call blocking, call category identification, STIR/SHAKEN STI-AS and/or STI-VS, or calling party augmentations. These value-added services are provided by SIP device 104 making changes to an original SIP message. The SIP node 104 receives the original message, parses the message, modifies the message, and transfers the message back to the SIP node that transmitted the message to SIP device 104. Any modifications contemplated by the present application are made without knowledge or approval from the initiating endpoint.

SIP device 104 is not directly in the call path, and therefore may be a simpler device by virtue of not being required to add via headers, decrement a max forwards header, add a record-route header, etc.

Although FIG. 1 shows SIP device 104 specifically interfacing with an S-CSCF 112, the interface to SIP device 104 could be through any SIP protocol node, including P-CSCF, A-SBC, I-SBC, TAS, BGCF, etc.

Referring now to FIG. 2, a system diagram 200 for a system to provide call blocking in accordance with embodiments of the present application is shown. System 200 shows an ABC Corporation UE 120 initiating a call through P-CSCF 108A. In this scenario, the control node (device 104) is changing the domain in the To and Request URI in the message to a domain that goes nowhere (i.e. is not resolvable in DNS and/or has no route). Device 104 cooperatively provides a call blocking function for the call and the call is blocked 204.

Referring now to FIG. 3, a flowchart of an external call control using API-based control process in accordance with embodiments of the conventional art is shown. FIG. 3 illustrates a conventional process for a control node to modify SIP messages, and requires APIs to interface to the control node in lieu of a SIP interface to the control node. The API could be REST, JSON, or some IN variant such as CAMEL or INAP. The control node for an API-based system would not be a SIP device 104, since the SIP device 104 receives messages directly without requiring an API for protocol conversion.

Comparing the process shown in FIG. 3 with the system diagrams shown in FIGS. 1 and 2, it should be noted that the process 300 of FIG. 3 requires API conversion to and from a non-SIP protocol between I/S-CSCF 112 and Device 104. Therefore, although the conventional art process 300 would include SIP interfaces 124 between P-CSCF 108A and I/S-CSCF 112, between I/S-CSCF 112 and P-CSCF 108B, and between I/S-CSCF 112 and TAS 116, there would not be SIP interfaces 124 between I/S-CSCF 112 and device 104.Flow begins at block 304.

At block 304, an SIP node 112 in the call path receives a SIP message from an initiating SIP node 108A in the call path. The call path includes at least the initiating SIP node 108A, the SIP node 112, and a destination SIP node 108B. The received message may be any type of SIP messages supported within the SIP protocol. Flow proceeds to block 308.

At block 308, the SIP node 112 parses the received SIP message in order to determine an SIP message type and content. Flow proceeds to block 312.

At block 312, the SIP node 112 sends a "100 Trying" SIP message back to the initiating SIP node 108A. This message informs the initiating SIP node 108A that the SIP message has been received and the SIP node 112 is attempting to process it. It provides positive acknowledgment that the SIP message was received but nothing more has been done with it yet. Flow proceeds to block 316.

At block 316, the SIP node 112 sets a timer. The timer may be a hardware timer in the SIP node 112, an application thread, or any other embodiment known in the art. Flow proceeds to block 320.

At block 320, the SIP node 112 extracts a calling party number, and stores the calling party number in memory. Flow proceeds to block 324.

At block 324, the SIP node 112 extracts a called party number and stores the called party number in memory. Flow proceeds to block 328.

At block 328, the SIP node 112 constructs an API query with the calling and called from numbers. Flow proceeds to block 332.

At block 332, the SIP node 112 sends the API query to a control node or device 104. The API query is intended to obtain certain information that will be used to modify the original SIP message from the initiating SIP node 108A. Flow proceeds to block 336.

At block 336, the SIP node 112 sets a timer. Therefore, the timer is started when the API query is sent from the SIP node 112 to the control node or device 104. Flow proceeds to block 340.

At block 340, the SIP node 112 receives an API response from the control node or device 104. Flow proceeds to block 344.

At block 344, the SIP node 112 cancels the timer, assuming the SIP node 112 receives the API response within a predetermined time period. If the timer has timed out, then the SIP node 112 has not received the API response within the predetermined time period. Flow proceeds to block 348.

At block 348, the SIP node 112 parses the API response if the timer has been canceled. Flow proceeds to block 352.

At block 352, the SIP node 112 performs the logic based on the API response. Flow proceeds to block 356.

At block 356, the SIP node 112 modifies the original SIP message based on the API response from the control node or device 104. Flow proceeds to block 360.

At block 360, the SIP node 112 performs the logic based on the modified SIP message. Flow proceeds to block 364.

At block 364, the SIP node 112 sends the modified SIP message to an SIP destination node 108B. Flow ends at block 364.

An INVITE or other message may be modified by the control node between blocks 332 and 340. In block 332, a SIP node sends an API query to the control node. After sending the API query, the SIP node sets a timer in block 336. The timer sets a time for response from the control node. In response to receiving the API query in block 332, the control node or device 104 looks up the requested information to the API query. In block 340, the SIP node 112 receives an API response from the control node or device 104 with the requested information, and if the timer is still active is canceled in block 344. Otherwise, the timer expires and the SIP node 112 uses the original INVITE or other SIP message instead of the information received through the API response in block 340.

Referring now to FIG. 4, a flowchart of an external call control using a SIP-based control process in accordance with embodiments of the present application is shown. FIG. 4 represents a preferred process of the present application. Steps of the process illustrated in FIG. 4 are performed by a single node in the call path of the SIP network. The control node or device 104 performs processing between blocks 416 and 424. By comparing the steps in FIG. 4 with the steps shown in FIG. 3, it becomes clear that the processing load on a SIP node 112 is significantly reduced over the conventional art using APIs. Also, any node (I-SBC, S-CSCF, TAS, P-CSCF, etc) in the call path can be configured to perform the illustrated process. Flow begins at block 404.

At block 404, a SIP node 112 in the call path receives a SIP message from an initiating SIP node 108A in the call path. The call path includes at least the initiating SIP node 108A, the SIP node 112, and a destination SIP node 108B. The received message may be any type of SIP messages supported within the SIP protocol. Flow proceeds to block 408.

At block 408, the SIP node 112 sends a "100 Trying" SIP message back to the initiating SIP node 108A. This message informs the initiating SIP node 108A that the SIP message has been received and the SIP node 112 is attempting to process it. It provides positive acknowledgment that the SIP message was received but nothing more has been done with it yet. Flow proceeds to block 412.

At block 412, the SIP node 112 sets a timer. The timer may be a hardware timer in the SIP node 112, an application thread, or any other embodiment known in the art. Flow proceeds to block 416.

At block 416, the SIP node 112 sends the SIP message to a control node or device 104. The SIP message is identical to what the SIP node 112 received from the initiating SIP node 108A. The control node or device 104 is not in the call path, although the control node or device 104 is coupled to the SIP node 112. The SIP node 112 forgoes parsing the SIP message and querying another SIP node to obtain information to modify the SIP message, as was described with reference to the conventional art illustrated in FIG. 3. Flow proceeds to block 420.

At block 420, the SIP node 112 sets a timer. Therefore, the timer is started when the other SIP message is sent from the SIP node 112 to the control node or device 104. Flow proceeds to block 424.

At block 424, the SIP node 112 receives a modified SIP message from the control node or device 104. Both the SIP message and the modified SIP message use the SIP protocol over SIP interfaces 124, and have the same SIP message type and process. The control node or device 104 parses the SIP message when received in order to determine the SIP message type and content, modifies some aspect of the SIP message content, and creates a modified SIP message. Flow proceeds to block 428.

At block 428, the SIP node 112 cancels the timer, assuming the SIP node 112 receives the modified SIP message within a predetermined time period. If the timer has timed out, then the SIP node 112 has not received the modified SIP message within the predetermined time period. Flow proceeds to block 432.

At block 432, the SIP node 112 parses the modified SIP message if the timer has been canceled. Otherwise, the SIP node 112 parses the original SIP message. Flow proceeds to block 436.

At block 436, the SIP node 112 performs the logic based on the modified SIP message. Flow proceeds to block 440.

At block 440, the SIP node 112 sends the modified SIP message to a SIP destination node 108B. Thereafter, the initiating SIP node 108A receives a response based on the modified SIP message. Flow ends at block 440.

It should be noted that, if the timer times out instead of being canceled by the SIP node 112, then the predetermined time period has expired which indicates some form of system or control node failure. In that case, the SIP node 112 will forward the original SIP message to the destination node instead of the modified SIP message. By doing this, a larger system failure is avoided, even if the SIP message is delivered without modifications performed by the control node or device 104.

When dealing with real-time communications, the length of time it takes to set up the communications channel is very important. The more latency introduced in the call set up, the more resources used within the network. For example all the nodes the call has gone through introduce latency, and not just the node or process which introduce the latency. Considering many millions of calls, the resulting impact of greater latency is significant.

The present application reduces network latency by requiring many fewer process steps than the conventional art process illustrated in FIG. 3. The control node (SIP device 104) receives an INVITE or other SIP message in block 416, and provides a modified INVITE or other SIP message in block 424. Advantageously, a separate API is not required to receive or transmit the INVITE or other SIP message, as is required with the control node of FIG. 3.

SIP device 104 in all likelihood would not return a message before the timer a block 336 expires due to some form of system failure. The timer is required in order to prevent the call from failing, and is preferably configurable by a network operator. A minimum value for the timer depends on performance of the SIP node 104, the network, and the distance between a "querying node" and a "queried node". If the system performs well and the nodes are in fairly close proximity, the timer value could perhaps be 5 ms or more. For a slower system or greater distances, the maximum timer value could be less than 500 ms, the SIP Ti timer value. In any case, the timer value should be tuned to the specific network that the SIP device 104 is deployed in.

The present application is not limited to the SIP INVITE messages alone. Any SIP message or process, including but not limited to INVITE, MESSAGE, SUBSCRIBE, NOTIFY, REGISTER, PUBLISH, REFER, AND UPDATE, may be processed and modified as required.

Referring now to FIG. 5, a block diagram of a control node or device 104 in accordance with embodiments of the present application is shown. It should be noted that any form of SIP node, including initiating SIP nodes 108A and destination SIP nodes 108B, may include similar or different hardware elements than illustrated in FIG. 5.

Control node or device 104 includes one or more processors 504 including any processing devices suitable for executing software applications such as Intel x86-compatible processors, embedded processors, mobile processors, and/or RISC processors. Processor 504 may include several devices including field-programmable gate arrays (FPGAs), memory controllers, North Bridge devices, and/or South Bridge devices. Although in most embodiments, processor 504 fetches application 520 program instructions from memory 512, it should be understood that processor 504 and application 520 may be configured in any allowable hardware/software configuration, including pure hardware configurations implemented in ASIC or FPGA forms. Memory 512 also includes an operating system and metadata 516, which includes parameters and data structures used to perform the processes of portions of the present application.

Control node or device 104 may include a display 532, keyboard 524, and pointing device 528 in order to interact with application 520 installed on control node or device 104 and provide information to a user of control node or device 104. However, any of the display 532, keyboard 524, and pointing device 528 may not be present in some embodiments. In some embodiments, the display 532 is a touch screen, with integrated keyboard 524 and pointing device 528 functions.

Control node or device 104 includes memory 512, which may include one or both of volatile and nonvolatile memory types. In some embodiments, the memory 512 includes firmware which includes program instructions that processor 504 fetches and executes, including program instructions for the operating system and software application 520 of the present application. For example, the program instructions may include instructions which parse and modify SIP messages. Examples of non-volatile memory 512 include, but are not limited to, flash memory, SD, Erasable Programmable Read Only Memory (EPROM), Electrically Erasable Programmable Read Only Memory (EEPROM), hard disks, and Non-Volatile Read-Only Memory (NOVRAM). Volatile memory 512 stores various data structures and user data. Examples of volatile memory 512 include, but are not limited to, Static Random Access Memory (SRAM), Dual Data Rate Random Access Memory (DDR RAM), Dual Data Rate 2 Random Access Memory (DDR2 RAM), Dual Data Rate 3 Random Access Memory (DDR3 RAM), Zero Capacitor Random Access Memory (Z-RAM), Twin-Transistor Random Access Memory (TTRAM), Asynchronous Random Access Memory (A-RAM), ETA Random Access Memory (ETA RAM), and other forms of temporary memory.

Stored within memory 512 is metadata 516 and one or more applications 520. Metadata 516 includes data structures and parameters of the present application, including but not limited to configuration parameters, predetermined values and time settings, and information required to operate control node or device 104.

Control node or device 104 includes one or more transceivers 508, which connect to a SIP interface 124 in order to transmit and receive data to and from I/S-CSCF 112. Network 104 includes all forms of wired or wireless interconnects, including but not limited to the Internet, Bluetooth, and other protocols and connection types.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, SD card, a USB stick, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the present claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   sending a query from an SIP node in an SIP call path to a control node that is not in the SIP call path, wherein the query comprises a called-from number and a calling number;
   by the SIP node, initiating a timer in response to the query being sent;
   by the SIP node, obtaining information from the control node that will be used to modify an SIP message based on the query;
   by the SIP node, canceling the timer based on the SIP node having received a response to the query within a predetermined time period;
   in response to the timer being canceled, parsing the SIP message by the SIP node to determine a message type and content;
   by the SIP node, modifying the content using the information from the control node to create a modified SIP message; and
   by the SIP node, transmitting the modified SIP message to a destination SIP node.

2. The method of claim 1, wherein the SIP message and the modified SIP message have a same SIP message type and process.

3. The method of claim 1, wherein the SIP call path comprises:
   an initiating SIP node, the SIP node, and the destination SIP node, wherein the initiating SIP node provides the SIP message to the SIP node.

4. The method of claim 3, wherein the initiating SIP node receives a response based on the modified SIP message.

5. The method of claim 1, wherein the predetermined time period starts when the SIP node transmits the SIP message to the control node and ends when the SIP node receives the modified SIP message from the control node.

6. The method of claim 5, wherein the predetermined time period is based on one or more of distance between the control node and the SIP node, control node performance, and a SIP timer value.

7. The method of claim 5, wherein the SIP node does not receive the modified SIP message from the control node within the predetermined time period, and, in response, forwards the SIP message to the destination SIP node instead of the modified SIP message.

8. The method of claim 1, wherein the control node is configured to:
   provide a value-added service to a SIP network comprising an initiating SIP node, the SIP node, and the destination SIP node.

9. The method of claim 8, wherein the value-added service comprises one or more of:
   call routing, header manipulation, internetworking functions, CNAM resolution, call blocking, call category identification, or calling party augmentation.

10. An SIP node, comprising:
    a processor; and
    a memory in communication with the processor, the memory storing instructions that when executed by the processor causes the device to:
      sending a query from the SIP node in an SIP call path to a control node that is not in the SIP call path, wherein the query comprises a called-from number and a calling number;
      initiate a timer in response to the query being sent
      obtain information from the control node that will be used to modify an SIP message based on the query;
      cancel the timer based on the SIP node having received a response to the query within a predetermined time period;
      in response to the timer being canceled, parse the SIP message by the SIP node to determine a message type and content;
      modify the content using the information from the control node to create a modified SIP message; and
      transmit the modified SIP message to a destination SIP node.

11. The SIP node of claim 10, wherein the SIP node comprises:
    a SIP Client, a SIP Server, a SIP Proxy, or a Redirect Server.

12. The SIP node of claim 10, wherein the SIP node does not parse the SIP message and queries another SIP node to obtain the information to modify the SIP message.

13. The SIP node of claim 10, wherein the SIP call path comprises:
    an initiating SIP node, the SIP node, and the destination SIP node, wherein communication between the initiating SIP node, the SIP node, the destination SIP node, and the device utilizes the SIP protocol.

14. The SIP node of claim 13, wherein an API-based protocol conversion is not required between the initiating SIP node and the destination SIP node.

15. The SIP node of claim 10, wherein the predetermined time period starts when the SIP node transmits the SIP message to the control node and ends when the SIP node receives the modified SIP message from the control node, wherein the SIP node does not receive the modified SIP message from the control node within the predetermined time period, and, in response, forwards the SIP message to a destination SIP node instead of the modified SIP message.

16. A non-transitory computer-readable storage medium comprising instructions that, when executed by a processor, cause the processor to perform:

sending a query from an SIP node in an SIP call path to a control node that is not in the SIP call path, wherein the query comprises a called-from number and a calling number;

by the SIP node, initiating a timer in response to the query being sent;

by the SIP node, obtaining information from the control node that will be used to modify an SIP message based on the query;

by the SIP node, canceling the timer based on the SIP node having received a response to the query within a predetermined time period;

in response to the timer being canceled, parsing the SIP message by the SIP node to determine a message type and content;

by the SIP node, modifying the content using the information from the control node to create a modified SIP message; and by the SIP node, transmitting the modified SIP message to a destination SIP node.

17. The non-transitory computer-readable storage medium of claim 16, wherein the instructions are configured to prevent the processor from adding via headers, decrementing a max forwards header, or adding a record-route header.

18. The non-transitory computer-readable storage medium of claim 16, wherein the SIP message and the modified SIP message utilize a SIP protocol and have a same SIP message type and process, wherein the SIP call path comprises an initiating SIP node, the SIP node, and a destination SIP node, and wherein an initiating SIP node provides the SIP message to the SIP node.

19. The non-transitory computer-readable storage medium of claim 16, wherein the predetermined time period starts when the SIP node transmits the SIP message to the control node and ends when the SIP node receives the modified SIP message from the control node, and wherein the predetermined time period is based on one or more of a distance between the control node and the SIP node, control node performance, or a SIP timer value.

20. The non-transitory computer-readable storage medium of claim 19, wherein the SIP node does not receive the modified SIP message from the control node within the predetermined time period, and in response, forwards the SIP message to the destination SIP node instead of the modified SIP message.

* * * * *